(12) United States Patent
Yao et al.

(10) Patent No.: US 9,853,356 B2
(45) Date of Patent: Dec. 26, 2017

(54) GROUND-BASED SATELLITE ANTENNA POINTING SYSTEM

(71) Applicant: Orbital Sciences Corporation, Dulles, VA (US)

(72) Inventors: Huiwen Yao, Potomac, MD (US); George Case, Leesburg, VA (US)

(73) Assignee: ORBITAL SCIENCES CORPORATION, Dulles, VA (US)

( * ) Notice: Subject to any disclaimer, the term of this patent is extended or adjusted under 35 U.S.C. 154(b) by 783 days.

(21) Appl. No.: 14/496,071

(22) Filed: Sep. 25, 2014

(65) Prior Publication Data

US 2016/0365629 A1    Dec. 15, 2016

Related U.S. Application Data

(60) Provisional application No. 61/882,690, filed on Sep. 26, 2013.

(51) Int. Cl.
*H01Q 3/08* (2006.01)
*H01Q 1/12* (2006.01)
(Continued)

(52) U.S. Cl.
CPC ............. *H01Q 3/08* (2013.01); *G01S 19/13* (2013.01); *H01Q 1/1257* (2013.01); *H01Q 1/288* (2013.01); *H04B 7/18519* (2013.01)

(58) Field of Classification Search
CPC ........ H01Q 3/08; H01Q 1/1257; H01Q 1/288; H04B 7/18519; G01S 19/13
(Continued)

(56) References Cited

U.S. PATENT DOCUMENTS 3,772,701 A * 11/1973 Wilkinson ............. G01S 3/146
342/353
4,599,619 A * 7/1986 Keigler ..................... G01S 1/08
342/352

(Continued)

FOREIGN PATENT DOCUMENTS

GB           2137428 A  * 10/1984  ............. G01S 3/325
JP         H03 4603 A    1/1991
WO   WO-2010/135465 A1  11/2010

OTHER PUBLICATIONS

R. B. Dybdal and K. M. SooHoo, "Narrow beamwidth satellite antenna pointing and tracking," 2011 IEEE International Symposium on Antennas and Propagation (APSURSI), Spokane, WA, 2011, pp. 2012-2015.*

*Primary Examiner* — John B Sotomayor
(74) *Attorney, Agent, or Firm* — Christensen, Fonder, Dardi & Herbert PLLC

(57) ABSTRACT

The present application includes systems and methods for determining pointing error of a satellite antenna. In one aspect a method for determining pointing error of a satellite antenna includes receiving, at a receiving station, a pointing error signal formed by the antenna and transmitted from a satellite, wherein the pointing error signal includes a first beacon (reference) signal and a modulated second beacon (error) signal. The receiving station may demodulate the received pointing error signal to recover the second beacon signal with respect to the first beacon signal, and based at least in part on the demodulated beacon signal, the receiving station may determine the pointing error of the satellite antenna.

19 Claims, 5 Drawing Sheets

(51) Int. Cl.
  *H01Q 1/28*   (2006.01)
  *G01S 19/13*  (2010.01)
  *H04B 7/185*  (2006.01)

(58) Field of Classification Search
  USPC ............... 342/354, 355, 358, 359, 385, 386
  See application file for complete search history.

(56) References Cited

U.S. PATENT DOCUMENTS

| | | | | |
|---|---|---|---|---|
| 4,630,058 | A * | 12/1986 | Brown | H04B 7/2041 342/352 |
| 5,041,836 | A * | 8/1991 | Paschen | H01Q 3/2694 342/102 |
| 5,742,253 | A * | 4/1998 | Conroy | H01Q 3/22 342/354 |
| 6,236,361 | B1 * | 5/2001 | Rosen | H01Q 1/288 342/352 |
| 6,676,087 | B2 * | 1/2004 | Wang | B64G 1/24 244/158.1 |
| 2003/0222816 | A1 * | 12/2003 | Liu | H01Q 3/005 342/359 |
| 2005/0007274 | A1 * | 1/2005 | Fowell | G01S 3/023 342/359 |
| 2005/0007275 | A1 * | 1/2005 | Fowell | H04B 7/2041 342/359 |
| 2005/0048915 | A1 | 3/2005 | Westall | |
| 2005/0178874 | A1 * | 8/2005 | Wang | B64G 1/222 244/3.16 |
| 2006/0054745 | A1 * | 3/2006 | Plotke | B64G 1/36 244/171 |
| 2009/0289850 | A1 * | 11/2009 | Liu | H01Q 1/185 342/359 |
| 2010/0231442 | A1 * | 9/2010 | Craig | H04B 7/0851 342/354 |
| 2014/0266871 | A1 * | 9/2014 | Ellis | H01Q 3/00 342/354 |
| 2016/0134006 | A1 * | 5/2016 | Ness | H01Q 1/1257 343/880 |
| 2016/0365629 | A1 * | 12/2016 | Yao | H01Q 1/1257 |

* cited by examiner

400

402 GENERATING A BEACON SIGNAL AT A SATELLITE

404 PROCESSING THE BEACON SIGNAL INTO A FIRST BEACON SIGNAL AND A SECOND BEACON SIGNAL

406 PROCESSING THE FIRST BEACON SIGNAL AND SECOND BEACON SIGNAL TO GENERATE A POINTING ERROR SIGNAL

408 TRANSMITTING THE POINTING ERROR SIGNAL TO A RECEIVING STATION

410 RECEIVING, AT THE RECEIVING STATION, THE POINTING ERROR SIGNAL

412 DETERMINING A POINTING ERROR BASED AT LEAST IN PART ON THE FIRST BEACON SIGNAL AND THE SECOND BEACON SIGNAL

414 TRANSMITTING A CONTROL SIGNAL TO THE SATELLITE, WHEREIN THE CONTROL SIGNAL IS ASSOCIATED WITH THE POINTING ERROR

416 MODIFYING AN ORIENTATION OF THE SATELLITE ANTENNA BASED AT LEAST IN PART ON THE CONTROL SIGNAL

FIG. 4

GROUND-BASED SATELLITE ANTENNA POINTING SYSTEM

CROSS-REFERENCE TO RELATED APPLICATIONS

This application claims the benefit of U.S. Provisional Application Ser. No. 61/882,690, filed Sep. 26, 2013, the contents of which are incorporated by reference herein in its entirety.

BACKGROUND

Satellites in orbit provide directed beams using antennas aimed precisely towards a target region on the Earth to provide high signal quality for transmitting and/or receiving ground stations in that region. However, due to a variety of factors, the directed beams may drift away from the intended region, significantly reducing the transmitted/received signal quality and potentially interrupting service (i.e. a communications link) between the satellite and transmitting/receiving ground stations. The drift of the directed beams is a particular problem for multi-spot beam satellites because of the narrow beamwidth of each directed beam. Maintaining an accurate orientation of the satellite antenna or antennas during orbit is necessary to ensure that the directed beams service the intended target region without degradations and interruptions. To compensate for any variations in satellite antenna orientation that are affecting the transmitted/received beams, satellites and satellite components, for example, antennas, require minor pointing corrections.

Some current solutions for determining pointing corrections include utilizing "on-board" auto-tracking systems or multi-station tracking. However each existing solution has drawbacks. Accordingly, improved techniques for ground-based determination and correction of pointing error of a satellite are disclosed herein.

SUMMARY

The present application includes systems and methods for determining pointing error of a satellite antenna. In one aspect a method for determining pointing error of a satellite antenna includes receiving, at a receiving station, a signal, containing pointing error information, transmitted from a satellite, wherein the signal (herein referenced as a pointing error signal) includes a first beacon signal and a modulated second beacon signal transmitted from the satellite antenna under consideration through a tracking feed. The tracking feed may be dedicated for the antenna pointing determination purpose or shared with other communications functions. The receiving station may demodulate the received pointing error signal to recover the second beacon signal with respect to the first beacon signal, and based at least in part on the demodulated beacon signal, the receiving station may determine the pointing error of the satellite antenna.

In some embodiments, the receiving station may also determine a control signal based on the pointing error and transmit the control signal to the satellite, wherein the control signal includes commands to modify an orientation of the satellite antenna. For example, the receiving station may generate a control signal to command the satellite antenna to actuate in the opposite direction as the pointing error in order to realign the satellite with the receiving station. In other embodiments, the receiving station may transmit the pointing error to a tracking and command (TT&C) station, and the TT&C station may determine and transmit the appropriate control signals.

In some embodiments, determining the pointing error may comprise comparing a magnitude of the second beacon signal with a magnitude of the first beacon signal and determining a phase of the second beacon signal with respect to the first beacon signal. In certain embodiments, the magnitude of the pointing error may be determined by the difference in magnitude of the first beacon signal and the second beacon signal. The direction of the pointing error may be determined by the phase of the second beacon signal with respect to the first beacon signal. As an illustrative example, the first beacon signal may be a "sum" signal (transmitted through the "sum" port of the tracking feed), configured to have a maximum magnitude along the boresight axis of the transmitting beam, and the second beacon signal may be a "difference" signal (transmitted through the "differential" port of the tracking feed), configured to have substantially zero magnitude along the boresight axis of the transmitting beam. If the satellite beam is aligned with the receiving station, the magnitude of the difference signal may be substantially zero. If the satellite beam is misaligned with the receiving station, the magnitude of the difference signal may be substantially nonzero, and the nonzero magnitude of the difference signal may be compared to the magnitude of the sum signal (which acts as a reference) in order to determine the magnitude of the pointing error of the transmit antenna. The phase of the difference signal may indicate the direction of the pointing error.

In some embodiments, the second beacon signal may be modulated using any one of phase modulation, frequency modulation, amplitude modulation, or any other suitable modulation technique. In some embodiments, the second beacon signal is modulated using a first phase angle and a second phase angle. For instance, the second beacon signal may be modulated by 0 degrees and 180 degrees with respected to the first beacon signal. In some embodiments, the pointing error signal is generated by combining the first beacon signal and the modulated second beacon signal in a spatial domain. For instance, the first and second beacon signal may be fed into the sum port and difference port of a multimode (or a 4-hron cluster) monopulse feed and combined in the spatial domain. In this manner, the first and second beacon signals may be transmit at the same time by a single antenna or antenna array. This method is beneficial because the first and second beacon signals may be affected by similar disturbances in transit, and thus altered by the transmission environment in substantially the same manner.

BRIEF DESCRIPTION OF THE DRAWINGS

FIG. 4 shows a flow diagram of a high-level process for detecting satellite antenna pointing error, in accordance with an embodiment of the present disclosure.

DETAILED DESCRIPTION

To provide an overall understanding of the disclosure, certain illustrative embodiments will now be described, including systems and methods for ground-based satellite antenna pointing error detection and correction. However, the systems and methods described herein may be adopted and modified as is appropriate for the application being addressed and that the systems and methods described herein may be employed in other suitable applications, and that such other additions and modifications will not depart from the scope thereof.

Figure 1:
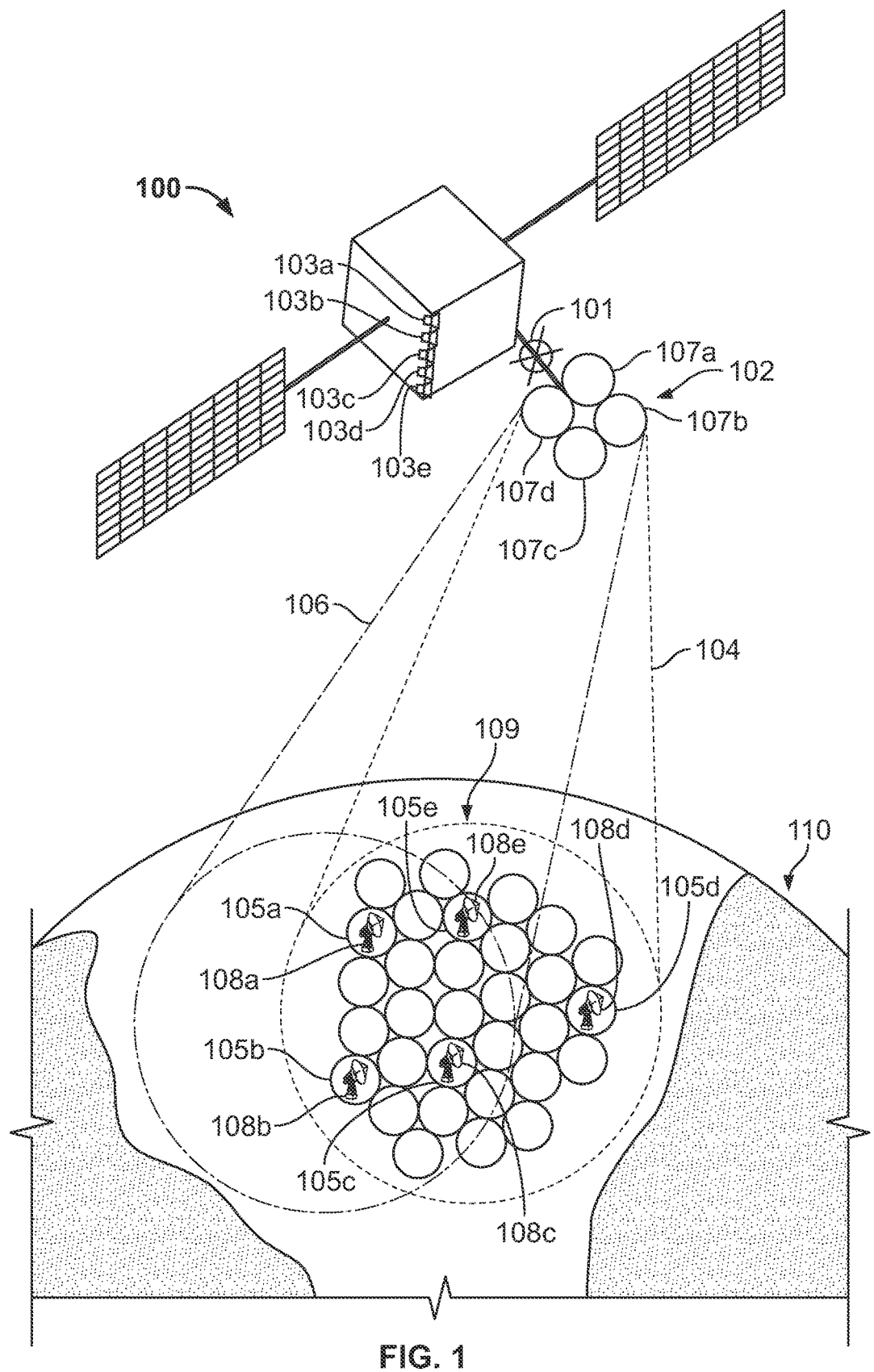
FIG. 1 shows an illustrative diagram of a multi spot-beam satellite in orbit around the Earth with a directed array of beams that is drifting away from an intended coverage region, in accordance with an embodiment of the present disclosure.

FIG. 1 shows a diagram of a multi spot-beam satellite system 100 in orbit around the Earth 110 providing a directed array 109 of spot beams to coverage region 104 from an antenna subsystem 102 to ground stations 108a-108e (collectively called ground stations 108). A spot beam is a highly directed satellite signal that is concentrated in power and covers a limited geographical area on the Earth 110. Each spot beam signal is provided by a feed horn such as one of the feed horns 103a-103e (collectively referred to as feed horns 103) or a feed horn cluster of the antenna 102 and shaped into a directed beam by one of the reflectors 107a-107d mounted on a common pallet. An adjustment mechanism 101 is associated with the pallet and adjusts the pointing of the pallet in response to commands from an onboard processor in the satellite. Alternatively, an adjustment mechanism 101 may be provided on each reflector 107a-107d to adjust each reflector 107a-107d individually based on commands received from the onboard processor. The adjustment mechanism 101 may be one-axis, two-axis, or three-axis to adjust the pointing of the pallet or each reflector 107a-107d. In other embodiments, feed horns 103 may provide spot-beam signals that are shaped by a single reflector. Antenna 102 may include any suitable number of feed horns 103. At least one feed horn 103c out of feed horns 103 is configured to transmit a tracking beacon signal to a receiving ground station 108 for detecting antenna pointing error, as will be described in relation to FIG. 2 below.

As shown in FIG. 1, the satellite system 100 is providing multiple spot-beams such as spot beams 105a-105e. At least one of ground stations 108a-108e are receiving respective spot beams 105a-105e and are within the coverage region of the respective spot beam. However, due to a variety of factors such as the transient response of the satellite attitude control systems, the uncertainty of satellite station keeping, the thermal distortion effects of the satellite and the antenna, or other factors, the orientation of the satellite antennas 107a-107d may shift and thus, the coverage region 104 may shift away from the intended coverage region 104 to an error region 106. This shift in the coverage region of a satellite antenna is called satellite antenna pointing error. As can be seen in FIG. 1, the satellite 100 orientation shifts to point the antenna 102 towards the error region 106 and certain ground stations 108 begin to lose signal quality or experience a degradation/interruption of service. For example, ground station 108e is on the edge of the error region 106 and thus may experience lower signal quality of communications with the satellite. In another example, ground station 108d is removed from the error region 106 and thus may experience a degradation of signal quality or even an interruption of service. Each spot beam may be operated at a frequency such that no two adjacent spot beams operate on a same frequency and in a same polarization. While each spot beam is shown in FIG. 1 as overlapping with an adjacent spot beam, the spot beams may be separated so that they do not overlap. The satellite 100 is in a geosynchronous orbit so that it maintains the same coverage region on the ground, although in other embodiments, the satellite may be in other suitable orbits for communication satellites.

Figure 2:
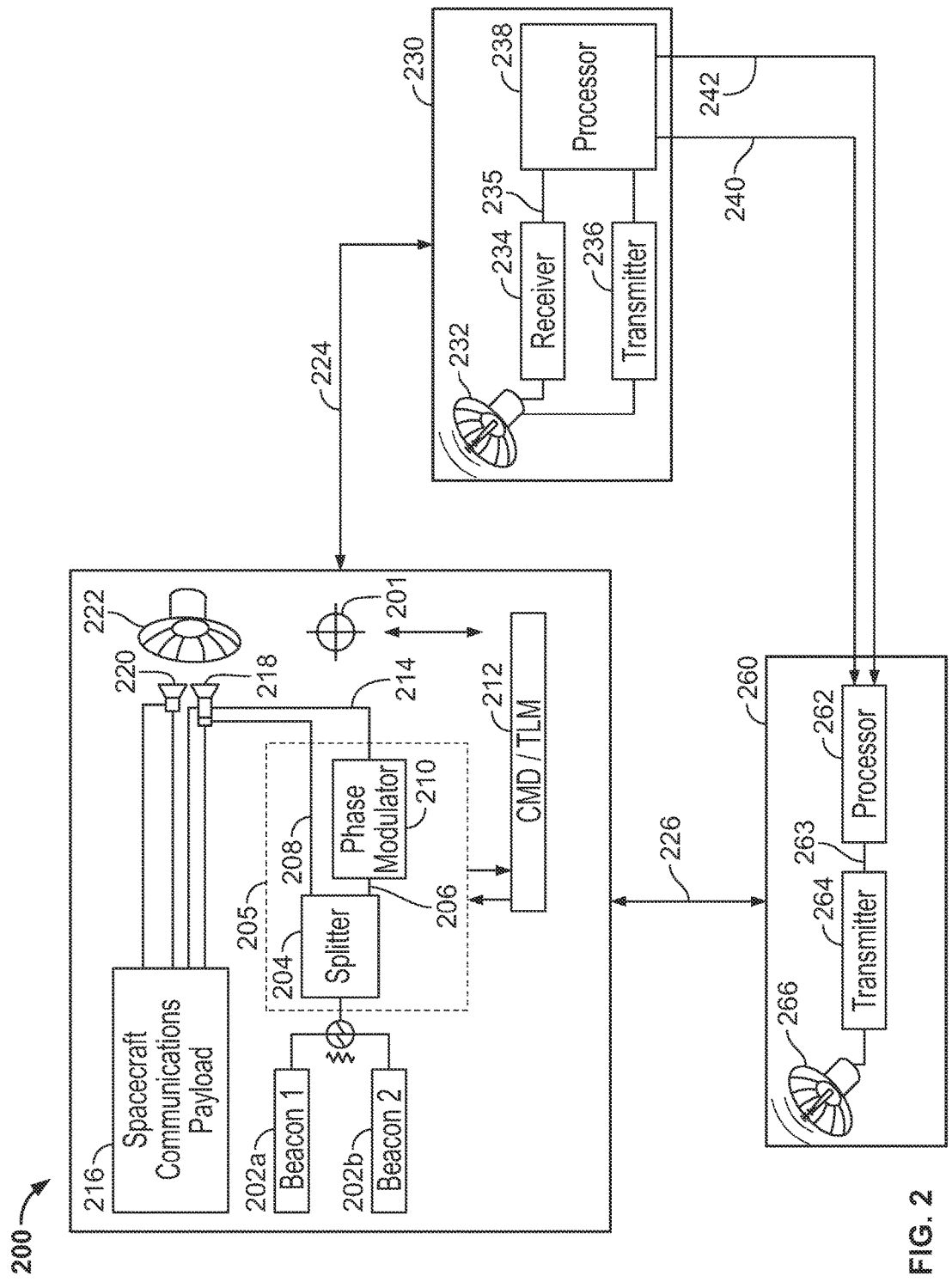
FIG. 2 shows an illustrative block diagram of a satellite 200 in communication with one or more ground stations, in accordance with an embodiment of the present disclosure.

FIG. 2 shows an illustrative block diagram of a satellite 200 in communication with one or more ground stations, such as ground station 230 and telemetry tracking and control station (TT&C station) 260. The satellite 200 may be a more detailed representation of satellite 100 in FIG. 1. The ground station 230 may be a more detailed representation of ground station 108 in FIG. 1. The satellite 200 includes a spacecraft communications payload 216, which is connected to one or more feed horns 220 of a multi spot-beam antenna. The one or more feed horns 220 transmit/receive a signal to/from a reflector 222, for example, which shapes multiple directed signal beams, including beam 224 which covers a ground station 230 or telemetry and control station 260. The satellite includes an adjustment mechanism 201 associated with the pallet that adjusts the pointing of pallet in response to commands from a command and telemetry subsystem 212. Alternatively, an adjustment mechanism 201 may be provided on each reflector 107a-107d to adjust each reflector 107a-107d individually based on commands received from the command and telemetry subsystem 212. The adjustment mechanism 201 may be one-axis, two-axis, or three-axis to adjust the pointing of the pallet or the reflector 222. The satellite 200 includes a tracking beacon 202a, which generates a radio frequency (RF) tracking signal or beacon signal used to track the antenna orientation of the satellite 200. In some embodiments, the satellite 200 may include a second tracking beacon 202b for redundancy measures. In some embodiments, the tracking beacon 202 may be the same beacon used for uplink power control in communications satellites. Beacon 202a sends a tracking signal to a processor 205. The processor 205 includes a splitter 204 which splits the beacon signal into two signals—a signal 208 and a signal 206. The split beacon signals 208 and 206 may be transmitted to the ground station 230 via a "sum" port and a "differential" port of a multi-mode feed horn (or a monopulse feed horn assembly) 218 and reflector 222, respectively. The ground station 230 includes an antenna 232 which can be configured to receive a directed signal beam 224, including the "sum" signal and the "differential" signal of the tracking beacon, from the satellite 200. The antenna 232 is configured to transmit received signals to a receiver 234 for demodulation and then send the demodulated signals 235 to a processor 238 for processing. In some embodiments, processor 238 may determine the satellite antenna pointing errors. Signals sent up for correction of the satellite antenna pointing errors through the satellite attitude control subsystem (ACS) or the adjustment mechanism 101 of the satellite antenna may be transmitted from the ground station 230 to the satellite 200 via transmitter 236 to the antenna 232. Alternatively, the pointing error signals are routed to a TT&C station 260, which is in communication with the ground station 230. The error signals are processed by processor 262 to generate the correction signals 263 and the correction signals 263 are transmitted to the satellite 200 via the TT&C antenna 266 and transmitter 264. In other embodiments, the receiving of the tracking signals, the determination of the pointing errors, the generation of the correction signals, and the transmission of the correction signals to the satellite 200 may each be performed by the TT&C station 260. The ground station 230 and the TT&C station 260 can also be referred to independently or collectively as a ground station.

Figure 3:
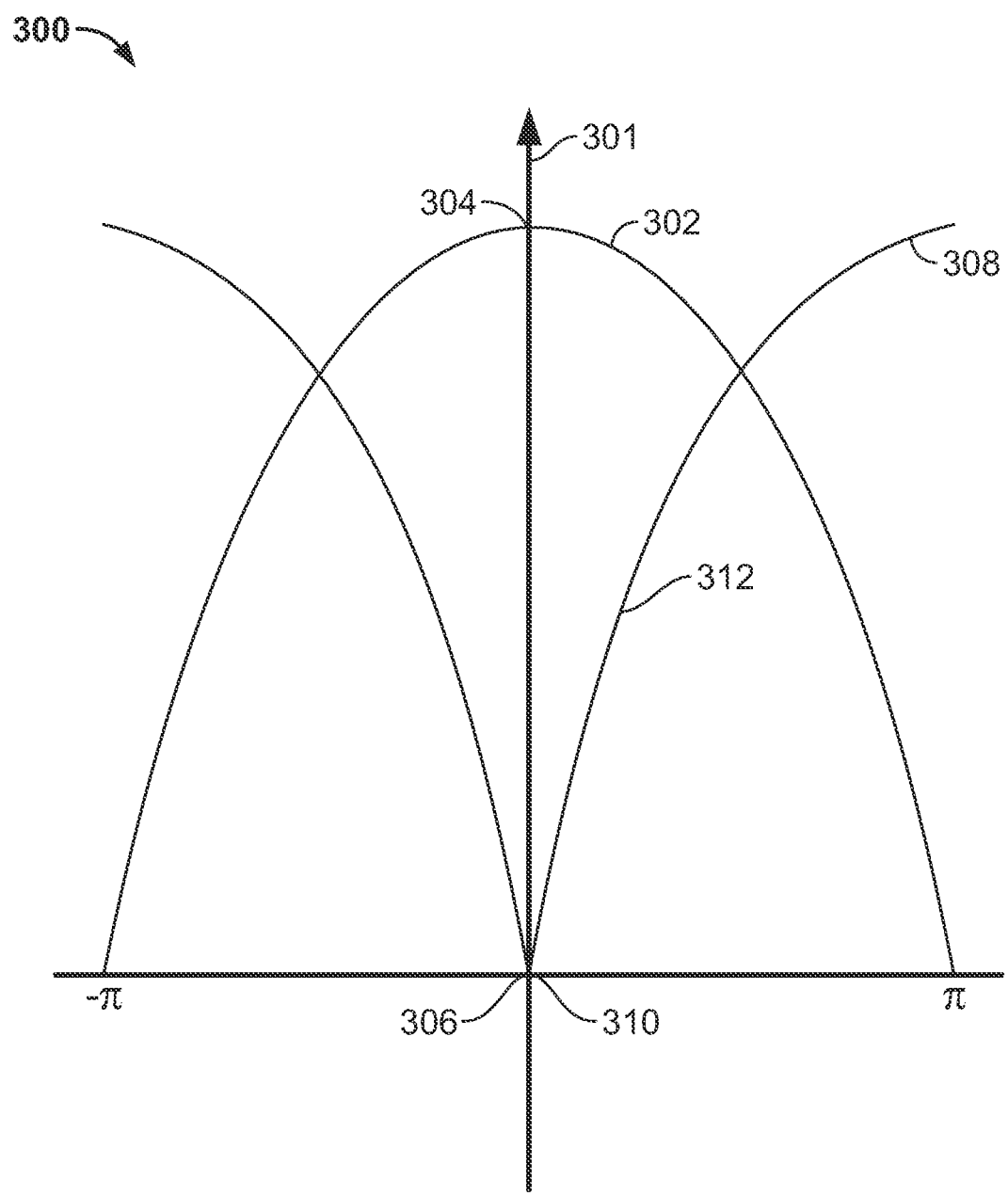
FIG. 3 shows an illustrative two-dimensional profile of an amplitude of a sum signal and an amplitude of a differential signal transmitted from a satellite, in accordance with an embodiment of the present disclosure.

The split beacon signals—signal 208 and signal 206, which are transmitted through a multimode tracking feed or a mono-pulse tracking feed—may be used to determine the satellite antenna pointing error. Referring to FIG. 3, which shows a two-dimensional profile 300 of an amplitude of a sum signal 302 and an amplitude of a differential signal 308, transmitted via the satellite antenna 222 and the tracking feed horn 218, the sum signal 302 is characterized by an amplitude profile that has a peak 304 at an origin 306 and the differential signal 308 is characterized by a zero 310 at the origin 306. In some embodiments, the origin 306 may correspond to a boresight axis of the satellite antenna 222. For example, the sum signal 302 may be symmetric about the boresight axis of the satellite antenna 222, and the differential signal 308 may have a substantially zero amplitude at the boresight axis of the satellite antenna 222 and a substantially non-zero amplitude off of the boresight axis of the satellite antenna 222. In certain embodiments, the differential signal 308 may include a non-zero value for the amplitude at the origin 306 due to noise in the signal or other factors. When the satellite 200 is aligned with ground station 230, the amplitude of the differential signal 308 may be zero or substantially zero (due to noise or other disturbances). The differential signal 308 may also include a sharp concave transition 312 near the zero 310. Thus, when the satellite 200 is misaligned with the ground station 230, the amplitude of the differential signal 308 may have a substantially nonzero amplitude. The high slope of the transition region 312 may aid in the detection of the nonzero amplitude above any noise or other disturbances which may affect the amplitude of differential signal 308. The ground station 230 receives and detects the amplitude and phase information of the tracking signals. The amplitude variation of the "differential" signal in the sharp transition region with respect to the "sum" signal provides the magnitude of the satellite antenna pointing error while the phase variation of the differential signal 308 provides the direction of the pointing error. The transition 312 and the related phase information may be used by the ground station to detect pointing error of the satellite antenna.

Referring back to FIG. 2, the processor 205 sends the signal 208 directly to the sum port of a multimode tracking feed 218 (or mono-pulse tracking feed). The signal 206 is processed by a phase modulator 210, which modulates the signal 206 by alternating 0 degrees and 180 degrees phase shifts. In other embodiments, the phase modulator 210 may modulate the signal 206 by 45 degrees, 90 degrees, 120 degrees, or any other suitable phase angle(s). The phase modulator 210 produces a modulated signal 214 and sends the modulated signal 214 to the differential port of the multimode tracking feed 218 (or the mono-pulse tracking feed). The multimode tracking feed 218 (or the mono-pulse tracking feed) combines the sum signal 208 and the modulated differential signal 214 in space through the reflector 222 which shapes the signals into a directed signal beam 224 to be received by a ground station 230 or telemetry and control (TT&C) station 260. The drift of the "differential" signal profile reflects the pointing drift of the satellite antenna. In Eq. 1, the pointing error signal S(t) is defined as the sum of a "sum" signal Σ(t) and a "differential" signal Δ(t) that is phase modulated at 0 degrees and 180 degrees, where exp is the base of the natural logarithm, j is an imaginary unit, θ is an angle about the origin, and i is a 0 or a 1 to define the phase shift.

$$S(t)=\Sigma(t)+\Delta(t)\cdot\exp(j\theta+i\pi),\qquad\text{Eq. 1}$$

where i=0 or 1

Since the "sum" signal and the "differential" signal are transmitted together in space, their relative relationship will be maintained and will not be impacted by the transmission environment until the error signal is demodulated by the ground station 230 or 260.

The ground station 230 receives the beam 224 containing the pointing error signals from the tracking feed 218 of the satellite 200 at the ground station antenna 232. The received pointing error signal is sent to a receiver 234, which demodulates the signal into a demodulated signal 235 before sending to a processor 238. Ground station 230 also includes a transmitter 236 to transmit a signal to the satellite 200. For example, ground station 230 may transmit a control signal to the satellite 200. Processor 238 receives the demodulated signal 235 and detects the transition of the differential signal 214. If the satellite is pointed in a correct orientation, then the amplitude of the "differential" signal 214 may be small or none. Processor 238 may compare the "sum" signal 208 and "differential" signal 214 components to remove any variations introduced during the signal transmission from the satellite to the ground station receiver. Processor uses the demodulated signal 235 having "sum" signal and "differential" signal components to determine the magnitude and direction of pointing error of a satellite antenna, or a satellite antenna elevation error 240 and a satellite antenna azimuth error 242. The determined satellite antenna pointing error may be transmitted to a TT&C station 260 for controlling the satellite to correct the antenna pointing error.

The TT&C station 260 includes a processor 262 that receives the satellite elevation error 240 and a satellite antenna pitch error 242. The processor 262 then processes the satellite elevation error 240 and a satellite antenna pitch error 242 to generate a correction signal 263. The correction signal 263 is sent to a transmitter 264, for transmission to the satellite through an antenna 266. In certain embodiments, the transmitter 264 modulates the signal using phase modulation. In other embodiments, the transmitter 264 modulates the control signal 263 using frequency modulation, amplitude modulation, or any other suitable modulation technique. The antenna 266 transmits the control signal 263 as a beam 226 to the satellite 200, which receives the beam 226 and processes the control signal at the command and telemetry subsystem 212. If the satellite receives instructions to correct its orientation, the command and telemetry subsystem 212 may instruct an antenna pointing adjustment mechanism 101 and/or 201 to correct the orientation of the satellite antenna. The processor 205 may communicate with the command and telemetry subsystem 212 for determining telemetry of the satellite and receiving commands from a ground station, such as ground station 230 or telemetry and control station 260. While the current embodiment shows a telemetry and control station 260 as generating and transmitting a control signal from the antenna elevation error 240 and antenna pitch error 242, it will be understood that the ground station 230 can perform substantially the same functions using processor 238, transmitter 236, and parabolic antenna 232.

FIG. 4 shows a flow diagram of a high-level process 400 for detecting satellite antenna pointing error. Process 300 may comprise generating a beacon signal at a satellite (402), processing the beacon signal into a first beacon signal and a second beacon signal (404), processing the first beacon signal and second beacon signal to generate a pointing error signal (406), transmitting the pointing error signal to a receiving station (408), receiving, at the receiving station, the pointing error signal (410), determining a pointing error based at least in part on the first beacon signal and the second beacon signal (412), and transmitting a control signal to the satellite, wherein the control signal is associated with the pointing error (414), and modifying an orientation of the antenna based at least in part on the control signal (516). Process 400 may be repeated to achieve a desired accuracy of satellite antenna pointing.

At 402, a satellite 200 generates a beacon signal using a beacon 202a-b. The beacon signal can be an unmodulated RF signal or a modulated RF signal. At 404, the satellite 200 processes the beacon signal into a first beacon signal and a second beacon signal. The first beacon signal may correspond to a sum signal that has an amplitude profile that includes a peak at the boresight axis of a satellite antenna. The second beacon signal may correspond to a differential signal that has a substantially zero amplitude at the boresight axis of a satellite antenna and substantially nonzero amplitude off of the boresight axis. The differential signal may also include a sharp concave transition near the boresight axis that is used by a ground station 230 to detect pointing error.

At 406, the satellite 200 processes the first beacon signal and the second beacon signal to generate a pointing error signal. The first beacon signal, signal 208, is sent directly to the sum port of a tracking feed associated with the antenna, generating a "sum" signal that has an amplitude profile that includes a peak at the boresight axis of the antenna. The second beacon signal, signal 206, is modulated at a phase modulator 210 by a phase angle of 0 degrees and 180 degrees before the modulated signal 214 is sent to the differential port of the tracking feed 218 associated with the antenna to produce a "differential" signal 206 that has an amplitude profile that includes a substantially zero magnitude at the boresight axis of the antenna. In other embodiments, the phase modulator may shift the phase of the differential signal 206 by 45 degrees, 90 degrees, 120 degrees, or any other suitable phase angle. The first beacon signal and the second beacon signal are combined through the tracking feed 218 in a spatial domain to generate a pointing error signal for transmission to the ground station 230 (or 260).

At 408, the satellite 200 transmits the pointing error signal to a ground station, such as ground station 230 or telemetry and control station 260. At 410, the ground station 230 receives the pointing error signal from the satellite 200. The receiver demodulates the pointing error signal and sends the demodulated signal 235 to a processor 238. At 412, the ground station 230 determines a pointing error based at least in part on the first beacon signal and the second beacon signal. In some embodiments, the ground station 230 compares the magnitude of the first beacon signal and the second beacon signal in order to determine the magnitude of the pointing error. For example, the ground station 230 may subtract the magnitude of the second beacon signal from the magnitude of the first beacon signal. The ground station 230 may also determine the phase of the second beacon signal with respect to the phase of the first beacon signal, and from the phase information, determine the direction of the pointing error. For example, the differential signal 308 may include a phase transition about the boresight axis of the satellite antenna. Thus, if the satellite antenna is misaligned to one direction, the phase information of the differential signal 308 may be different than if the satellite antenna was misaligned in the opposite direction.

At 414, a receiving station, such as ground station 230 or telemetry and control station 260, transmits a control signal to the satellite. The ground station 230 sends the calculated pointing error including antenna elevation error 240 and antenna azimuth error 242 to a processor 262 in the telemetry and control station 260. The telemetry and control station 260 processes the antenna elevation error 240 and antenna azimuth error 242 to determine a control signal 263 (or set of control signals) to transmit to the satellite 200. The control signal 263 is sent to a transmitter 264, at which point the control signal will be prepared for transmission to the satellite 200. Transmitter 264 modulates the control signal 263 and sends the modulated signal to the TT&C antenna 266, which shapes the control signal into a beam 226 and transmits the beam 226 to the satellite 200. In certain embodiments, the transmitter 264 modulates the control signal 263 using phase modulation. In other embodiments, the transmitter 264 modulates the control signal 263 using frequency modulation, amplitude modulation, or any other suitable modulation technique. While the current embodiment shows a telemetry and control station 260 performing the steps of generating and transmitting a control signal from the antenna elevation error 240 and antenna azimuth error 242, it will be understood that the ground station 230 can perform substantially the same steps using processor 238, transmitter 236, and antenna 232.

At 416, satellite 200 modifies an orientation of the antenna based at least in part on the control signal. The satellite command and telemetry subsystem 212 of satellite 200 receives the control signal and instructs the pointing adjustment mechanism to adjust the orientation of the pallet or reflector 222. Process 400 may be repeated to achieve a desired accuracy of satellite antenna pointing.

Figure 5:
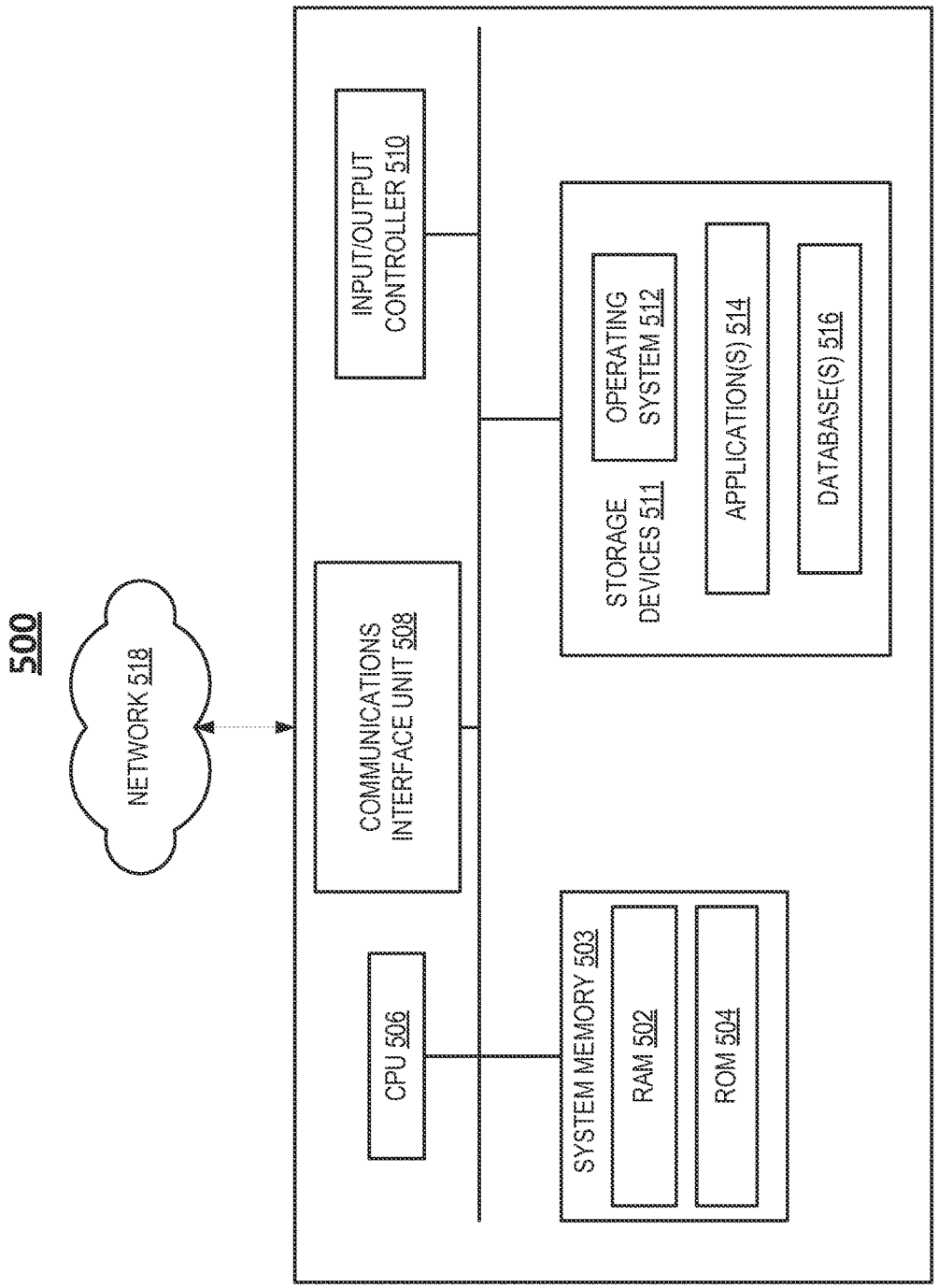
FIG. 5 shows a block diagram of a computing device, for performing any of the processes described herein, in accordance with an embodiment of the present disclosure.

FIG. 5 is a block diagram 500 of a computing device, such as any of the processing or circuitry components of the system of FIG. 2, for performing any of the processes described herein, in accordance with an embodiment of the disclosure. Each of the components of these systems may be implemented on one or more computing devices 500. In certain aspects, a plurality of the components of these systems may be included within one computing device 500. In certain embodiments, a component and a storage device 511 may be implemented across several computing devices 500.

The computing device 500 comprises at least one communications interface unit 508, an input/output controller 510, system memory 503, and one or more data storage devices 511. The system memory 503 includes at least one random access memory (RAM 502) and at least one read-only memory (ROM 504). All of these elements are in communication with a central processing unit (CPU 506) to facilitate the operation of the computing device 500. The computing device 500 may be configured in many different ways. For example, the computing device 500 may be a conventional standalone computer or alternatively, the functions of computing device 500 may be distributed across multiple computer systems and architectures. In FIG. 5, the computing device 500 is linked, via network 518 or local network, to other servers or systems. The network 518 may include a receiving station, such as ground station 230 or TT&C station 260, that communicates with the satellite 200 and the receiving station may communicate with other servers or systems.

The computing device 500 may be configured in a distributed architecture, wherein databases and processors are housed in separate units or locations. Some units perform primary processing functions and contain at a minimum a general controller or a processor and a system memory 503.

In distributed architecture embodiments, each of these units may be attached via the communications interface unit 508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to, Ethernet, SAP, SAS™, ATP, BLUETOOTH™, GSM and TCP/IP.

The CPU 506 comprises a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers or client terminals.

The CPU 506 is also in communication with the data storage device 511. The data storage device 511 may comprise an appropriate combination of magnetic, optical or semiconductor memory, and may include, for example, RAM 502, ROM 504, flash drive, an optical disc such as a compact disc or a hard disk or drive. The CPU 506 and the data storage device 511 each may be, for example, located entirely within a single computer or other computing device or connected to each other by a communication medium, such as a USB port, serial port cable, a coaxial cable, an Ethernet cable, a telephone line, a radio frequency transceiver or other similar wireless or wired medium or combination of the foregoing. For example, the CPU 506 may be connected to the data storage device 511 via the communications interface unit 508. The CPU 506 may be configured to perform one or more particular processing functions.

The data storage device 511 may store, for example, (i) an operating system 512 for the computing device 500 (ii) one or more applications 514 (e.g., computer program code or a computer program product) adapted to direct the CPU 506 in accordance with the systems and methods described here, and particularly in accordance with the processes described in detail with regard to the CPU 506 or (iii) database(s) 516 adapted to store information that may be utilized to store information required by the program.

The operating system 512 and applications 514 may be stored, for example, in a compressed, an uncompiled and an encrypted format, and may include computer program code. The instructions of the program may be read into a main memory of the processor from a computer-readable medium other than the data storage device 511, such as from the ROM 504 or from the RAM 502. While execution of sequences of instructions in the program causes the CPU 506 to perform the process steps described herein, hard-wired circuitry may be used in place of, or in combination with, software instructions for embodiment of the processes of the present disclosure. Thus, the systems and methods described are not limited to any specific combination of hardware and software.

The term "computer-readable medium" as used herein refers to any non-transitory medium that provides or participates in providing instructions to the processor of the computing device 500 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer readable media may be involved in carrying one or more sequences of one or more instructions to the CPU 506 (or any other processor of a device described herein) for execution. For example, the instructions may initially be borne on a magnetic disk of a remote computer (not shown). The remote computer may load the instructions into its dynamic memory and send the instructions over a wireless connection using a high gain antenna. A communications device local to a computing device 500 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While preferable embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in practice. For example, the disclosure herein may be applied to spot beams and any other type of satellite signals. Although the ground station and TT&C station are described independently, each station can be considered a ground station and the functions and features described for each may be performed by one aggregated station, or by multiple stations.

What is claimed is:

1. A method for determining pointing error of a satellite antenna, the method comprising:

receiving, at a receiving station, a pointing error signal transmitted from a satellite, wherein the pointing error signal includes a first beacon signal and a modulated second beacon signal both transmitted from the satellite simultaneously at a first frequency and from a single antenna;

demodulating, using a control circuitry, the received pointing error signal to recover the first beacon signal and the modulated second beacon signal; and determining, using the control circuitry, a pointing error based at least in part on the first beacon signal and the modulated second beacon signal, wherein determining the pointing error based at least in part on the first beacon signal and the modulated second beacon signal comprises:
comparing a magnitude of the modulated second beacon signal with a magnitude of the first beacon signal; and
determining a phase of at least one of the first beacon signal and the modulated second beacon signal.

2. The method of claim 1, further comprising:
determining, using the control circuitry, a control signal based on the pointing error; and
transmitting the control signal to the satellite, wherein the control signal includes commands to modify an orientation of the satellite antenna.

3. The method of claim 1, wherein comparing the magnitude of the modulated second beacon signal with the magnitude of the first beacon signal comprises taking a difference in magnitude of the first beacon signal and the modulated second beacon signal.

4. The method of claim 1, wherein determining the pointing error based at least in part on the first beacon signal and the modulated second beacon signal further comprises:
determining a direction of the pointing error based on the determined phase; and
determining a magnitude of the pointing error based on the comparison of the magnitude of the modulated second beacon signal with the magnitude of the first beacon signal.

5. The method of claim 1, wherein at least one of the first beacon signal and the modulated second beacon signal is configured to have substantially zero magnitude along a boresight axis of the satellite antenna and a substantially non-zero magnitude off of the boresight axis of the satellite antenna.

6. The method of claim 1, wherein the modulated second beacon signal is modulated using one of, phase modulation, frequency modulation, or amplitude modulation.

7. The method of claim 1, wherein the modulated second beacon signal is modulated using a first phase angle and a second phase angle, and wherein the first phase angle is 0 degrees, and wherein the second phase angle is 180 degrees.

8. The method of claim 1, wherein the pointing error signal is generated by combining the first beacon signal and the modulated second beacon signal in a spatial domain.

9. A system for determining pointing error of a satellite antenna, the system comprising:
a receiver in communication with a satellite configured to receive a pointing error signal transmitted from the satellite, wherein the pointing error signal includes a first beacon signal and a modulated second beacon signal both transmitted from the satellite simultaneously at a first frequency and from a single antenna;
control circuitry configured to:
demodulate the received pointing error signal to recover the first beacon signal and the modulated second beacon signal; and
determine a pointing error based at least in part on the first beacon signal and the modulated second beacon signal, wherein the control circuitry being configured to determine the pointing error based at least in part on the first beacon signal and the modulated second beacon signal includes being configured to:
compare a magnitude of the modulated second beacon signal with a magnitude of the first beacon signal; and
determine a phase of at least one of the first beacon signal and the modulated second beacon signal.

10. The system of claim 9, wherein the control circuitry is further configured to:
determine a control signal based on the pointing error; and
transmit the control signal to the satellite, wherein the control signal includes commands to modify an orientation of the satellite antenna.

11. The system of claim 9, wherein the control circuitry is configured to compare the magnitude of the modulated second beacon signal with the magnitude of the first beacon signal by taking a difference in magnitude of the first beacon signal and the modulated second beacon signal.

12. The system of claim 9, wherein the control circuitry is further configured to determine the pointing error based at least in part on the first beacon signal and the modulated second beacon signal by:
determining a direction of the pointing error based on the determined phase; and
determining a magnitude of the pointing error based on the comparison of the magnitude of the modulated second beacon signal with the magnitude of the first beacon signal.

13. The system of claim 9, wherein at least one of the first beacon signal and the modulated second beacon signal is configured to have substantially zero magnitude along a boresight axis of the satellite antenna and a substantially non-zero magnitude off of the boresight axis of the satellite antenna.

14. The system of claim 9, wherein the modulated second beacon signal is modulated using one of, phase modulation, frequency modulation, or amplitude modulation.

15. The system of claim 9, wherein the modulated second beacon signal is modulated using a first phase angle and a second phase angle wherein the first phase angle is 0 degrees, and wherein the second phase angle is 180 degrees.

16. The system of claim 9, wherein the pointing error signal is generated by combining the first beacon signal and the modulated second beacon signal in a spatial domain.

17. A system for determining pointing error of a satellite antenna, the system comprising:
a satellite including control circuitry and an antenna, the control circuitry including:
a tracking beacon configured to generate an initial beacon signal at a first frequency;
a processor communicatively coupled to the tracking beacon to receive the generated tracking signal, the processor including a splitter configured to split the initial beacon signal into a first beacon signal and a second beacon signal; and
a phase modulator communicatively coupled to the processor and configured to receive the second beacon signal and to generate a modulated second beacon signal using a first phase angle and a second phase angle;
wherein the antenna is configured to transmit the first beacon signal and the modulated second beacon signal simultaneously and at the first frequency as a pointing error signal for a ground based receiver, and the antenna is only transmitting device on the satellite to transmit both the first beacon signal and the modulated second beacon signal.

18. The system of claim 17, further comprising:
a receiver in communication with the satellite configured to receive the first beacon signal and the modulated second beacon signal, the receiver including control circuitry configured to:
demodulate the first beacon signal and the modulated second beacon signal; and determine a pointing error based at least in part on the first beacon signal and the modulated second beacon signal.

19. The system of claim 17, wherein the pointing error signal is defined as a sum of the first beacon signal and the modulated second beacon signal and is represented by the algorithm:

$$\Sigma(t)+\Delta(t)\cdot\exp(j\theta+i\pi)$$

where $\Sigma(t)$ is the first beacon signal, $\Delta(t)$ the second beacon signal, and exp( ) is the base of the natural logarithm, j is an imaginary unit, $\theta$ is an angle about the origin and i is a 0 or a 1 to define the phase shift.

* * * * *